United States Patent
Tan et al.

[11] Patent Number: 6,008,640
[45] Date of Patent: Dec. 28, 1999

[54] DETECTION AND MEASUREMENT OF HEAD DISC INTERFERENCE USING READ BACK SIGNAL (WITHOUT ACOUSTIC EMISSION SENSOR OR LASER DOPPLER VIBROMETER)

[75] Inventors: Alan C. Tan; Myint Ngwe; Joseph C. Liu, all of Singapore, Singapore

[73] Assignee: Seagate Technology, Inc.

[21] Appl. No.: 08/940,929

[22] Filed: Sep. 30, 1997

Related U.S. Application Data

[60] Provisional application No. 60/044,343, Apr. 28, 1997.

[51] Int. Cl.$^6$ .......................... G11B 5/455; G11B 27/36; G01R 33/12; G01H 17/00
[52] U.S. Cl. .............................. 324/212; 360/31; 369/55
[58] Field of Search .................................. 324/210, 212; 360/25, 31, 53, 75; 369/53, 55; 73/570

[56] References Cited

U.S. PATENT DOCUMENTS

| | | | |
|---|---|---|---|
| 5,594,595 | 1/1997 | Zhu | 360/31 |
| 5,742,446 | 4/1998 | Tian et al. | 324/212 X |
| 5,838,153 | 11/1998 | Inbar | 324/212 |

*Primary Examiner*—Gerard Strecker
*Attorney, Agent, or Firm*—Shawn B. Dempster; Edward P. Heller, III

[57] ABSTRACT

A method and apparatus for detecting and measuring head-disc interference, in a disc drive, for the purpose of taking preventative and corrective measures, to prevent disastrous head crashes and permanent data loss, is disclosed. The method and apparatus detect and measure the frequency modulation (FM) of a read back signal generated by longitudinal head oscillation, as a result of head-disc interference. The longitudinal head oscillation can be ascribed to the non-linear response of the air bearing supporting the head on the disk surface. The response exhibits a vibration frequency in the head in the 100 to 250 kHz range. The more severe the interference contact is, the higher the vibration amplitude which then leads to read signal frequency modulation (FM). A method and apparatus is described to detect the FM modulation and thereby to detect the severity of the head disk interference for proximity recording. A pre-written pattern on the disk can be read back to monitor for FM, and a modulation index, $\beta$, is generated by observing the resulting signal. By demodulating the modulated read back signal, the severity of the interference can be determined. This method can be applied as a diagnostic tool at a manufacturing test station, in a laboratory test setup, or in a disk drive using the disk drive's own read/write channel electronics, without the need for an external sensor.

18 Claims, 5 Drawing Sheets

DETECTION AND MEASUREMENT OF HEAD DISC INTERFERENCE USING READ BACK SIGNAL (WITHOUT ACOUSTIC EMISSION SENSOR OR LASER DOPPLER VIBROMETER)

RELATED APPLICATION

This application is related to co-pending Provisional Patent Application Ser. No. 60/044,343, entitled: "DETECTION & MEASUREMENT OF HEAD DISC INTERFERENCE USING READ BACK SIGNAL (WITHOUT ACOUSTIC EMISSION SENSOR OR LASER DOPPLER VIBROMETER)", filed Apr. 28, 1997 by the same applicants.

TECHNICAL FIELD

The present invention relates to tribology of read/write heads and magnetic media used in disc drives. More particularly, the present invention relates to methods of detecting and measuring the interference between the read/write heads and the magnetic media used in disc drives. Even more particularly, the present invention relates to non-invasive methods of detecting and measuring the interference between the read/write head and magnetic media used in disc drives.

BACKGROUND ART

In a disc drive using magnetic recording media, data is recorded in concentric tracks on a plurality of disc surfaces. The recording heads are mechanically ganged together and are arranged one per surface with all heads nominally positioned over the same radial track location. The assembly of heads are positioned in unison using a voice coil motor. The recorded data, consisting of a certain topology of magnetic transitions are recorded on the surface, or surfaces, of the magnetic media. The reading and writing of the recorded data is accomplished by read and write heads that are positioned on the required track by the drive's positioning control system. During operation of the disc drive, the heads fly over the media. The fly height depends on the drive design and can be very small, typically sub micro-inch to micro-inches. In addition, the texture of the media can be rough depending upon the media used. As a result of the physical properties of the elements involved and of the operating conditions, head to disc interference, or contact may occur. The interference is significant because of the impact on the principles involved in reading the data. The magnetic transitions emanate magnetic fields from the magnetized regions on the disc (disk). When a magnetized region passes under a head, flux reversals are detected to produce an analog signal (a voltage pulse) which is converted to a digital signal by the drive's read electronic circuitry. The shape of the voltage pulse and its ability to be recovered depends on the type of media coating and the fly height, sometimes also referred to as the distance from the read head gap. The fly height is a function of the head-surface separation and the depth of the flux reversals within the coating of the magnetic media. When head-disc interference occurs, air bearing vibrations in the 120 to 250 Khz range are present. The vibration in the air bearings leads to slider motion in the direction along the data track. This motion causes the transducer to move back and forth along the track during the read back operation. Such back and forth movement, or oscillation, of the head in the longitudinal axis causes the head to read magnetic flux transitions earlier and later, which cause frequency modulation in the read back signal. The modulation is proportional to the amount of slider vibration, which is a reflection of the severity of the head-disc interference. The more severe the interference, the more severe the modulation. The interference may be slight or severe, depending upon the amount of clearance that can be established by the air bearing supporting the slider. Wear or burnishing of the transducer and the alumina at the back of the slider typically will occur, see generally FIG. 2. The continued interference leads to generation of debris, contamination of the slider and consequently, degradation of the read signal from the drive. If such interference persists and the condition is not checked, this eventually leads to disastrous head crashes and permanent data loss.

The known methods and apparatus used for analysis of head-disc interference during drive operations include the use of acoustic emission (AE) sensors and laser doppler vibrometers to detect mechanical vibrations. In using the AE sensor and the laser doppler vibrometer, the target components are inside the head gimbal assembly (HGA). In the case of the AE sensor, the device must be mounted on the E-block member of the HGA. Any mechanical vibration on the HGA during drive operation induces (or transduces) a corresponding electrical signal at the output of the AE sensor. In using the laser doppler vibrometer, the laser is pointed at the slider within the head disc assembly (HDA) containing the HGA to detect vibrations on this component. The use of the AE sensor and the laser doppler vibrometer involve an invasive procedure that requires opening the HDA which has inherent disadvantages of introducing contamination into the assembly. The contaminations are minimized by conducting the procedure in a clean room environment. The mounting of the AE sensor is typically accomplished using glue which introduces contamination, not only at time of mounting, but also at time of removal of the sensor element. If a number of head disc assemblies are suspected of having head-disc interference, each must be invasively analyzed. The signal produced at the output of the AE sensor, or the vibration detected by the laser doppler vibrometer, can be caused by a number of factors which, although minimal, the potential for erroneous oscillation sources exists. For example, inadvertent vibration of the test bench, HDA or other elements not associated with the HGA could be erroneously identified as an oscillation source. Further, in using these methods, the actual head that is experiencing longitudinal oscillations can not be particularly identified. Mechanical vibration detection methods are viewed as being limited in that all modes of vibration, i.e. longitudinal, lateral and vertical vibrations contribute to the response of the AE sensor, or laser doppler vibrometer, and as such, the amount of oscillation due only to the longitudinal axis cannot be determined.

To applicants' knowledge, there are no known apparatus and method which capitalize on the existence of frequency modulation that is created by head-disc interference during reading of recorded magnetic transitions to analyze the severity of the head-disc interference.

Therefore, there is a need for an improved method and apparatus for determining the existence, severity and mode of head and media interference so as to take corrective measures against generation of debris, contamination of the slider and consequently, degradation of the read signal from the drive and to prevent disastrous head crashes and permanent data loss. In particular, there is a need for apparatus and method which accurately and precisely detects and measures longitudinal axis vibration of a head that is caused by head-disc interference.

It is therefore a primary object of the present invention to provide a method and apparatus for detecting head-disc interference for purposes of determining the existence of head-disc interference so as to take preventative and corrective measures to prevent disastrous head crashes and permanent data loss by capitalizing on the frequency modulation that is generated by head-disc interference.

It is another related object of the present invention to provide a disc drive apparatus and method for detecting and measuring longitudinal axis (along the track) head-disc interference for purposes of determining the severity of the head-disc interference so as to take preventative and corrective measures to prevent disastrous head crashes and permanent data loss by capitalizing on the frequency modulation that is generated by head-disc interference.

DISCLOSURE OF INVENTION

Accordingly, the foregoing objects are accomplished by providing a method and apparatus for detecting and measuring longitudinal axis (along the track) head-disc interference. The objects of the present invention are provided for the purposes of determining the severity of head-disc interference in disc drive apparatus so as to take preventative and corrective measures directed at preventing disastrous head crashes and permanent data loss in disc drive operation. The method and apparatus are effected by capitalizing on the frequency modulation that is generated by the action of head-disc interference. As noted previously, it is known that when head-disc interference occurs, air bearing vibration, that is in the 120 to 250 Khz range, is present and cause frequency modulation in the read back signal. The present invention is based on analysis that the modulation is proportional to the amount of slider vibration, which is a reflection of the severity of the head-disc interference. The more severe the interference, the more severe the modulation. The present invention capitalizes on the fact that this frequency modulation reveals the existence and the severity of the head-disc interference. In order to determine the existence of the head-disc interference, the present invention comprises a step of initially writing an analog pattern, having a known magnitude and a known constant frequency, herein referred to as the carrier frequency $f_c$, on a known track of a particular magnetic disc in the head disc assembly that correlates to a particular head that may be experiencing head-disc interference. While writing the test pattern, the test signal may be verified to ensure that it is not frequency modulated. Subsequently, the contents of the read-back signal are monitored and inspected for frequency modulation (FM). The detection of FM in a signal can be accomplished in a number of ways, and may be utilized to accomplish the objects of the present invention. By example, one way to detect FM is by analyzing the frequency spectrum of a signal with a spectrum analyzer. Using this method, FM in the signal is characterized by symmetrical sidebands about a center frequency which, in accordance with the present invention, is the carrier frequency of the test pattern Tp. These sidebands and the main peak are frequency spaced apart from each other by $f_m$, the modulating frequency. The relative amplitudes of the sidebands and the carrier are determined by the coefficients of the Bessel function of the first kind. Therefore, in using the spectrum analyzer, the relative amplitudes of the FM sidebands and the carrier can be measured and hence, the modulation index $\beta$, the modulating frequency $f_m$ and the peak frequency deviation $\Delta f$ can be determined. Alternatively, and by example, FM in a signal can also be detected and measured using a modulation analyzer which will output the modulating frequency $f_m$ and the peak frequency deviation $\Delta f$. From this information, the modulation index $\beta$ can be determined from the modulation index equation, ($\beta=\Delta f/f_m$). Yet another way of detecting FM in a signal, and by example only, is to use an FM demodulator which, in accordance with the present invention, may be an external or internal component in a disc drive. For an internal FM demodulator application of the present invention, the phase lock loop circuitry of the read channel chip is used to demodulate the read back signal that relates to the test pattern Tp. The output of the FM demodulator is a signal whose frequency is the modulating frequency $f_m$ and its amplitude represents the peak frequency deviation $\Delta f$. Again, with this information, $\beta$ can be determined using the modulation index equation ($\beta=\Delta f/f_m$). As stated, the methods of FM detection and demodulation, as described above, are exemplary and are not intended to limit the scope of accomplishing the objects of the present invention. Having determined the modulation index $\beta$, peak frequency deviation $\Delta f$, and the modulating frequency $f_m$, then the peak-peak period deviation, or timing jitter, and the longitudinal head vibration velocity and displacement are determined. The timing jitter represents the reading of magnetic flux transitions earlier and later, as a result of longitudinal head oscillation. The longitudinal head vibration velocity and displacement amplitude represent how fast and how far forward and backward the head moves. The displacement amplitude is a measure of the severity of the head-disc interference in the longitudinal direction, i.e. the direction along the data track. Such information is not only useful as a measurement of the severity of the head-disc interference, but is also useful and applicable as an aid for improving HGA designs. The method can be practised as a diagnostic tool at a manufacturing test station, at a laboratory test setup using test equipment, such as by using the spectrum analyzer, or modulation analyzer, or as a diagnostic tool in the field at a disk drive level using the disk drive's read/write channel electronics, namely the read channel's phase lock loop as an FM demodulator. At a disc drive level of implementation, the method can include threshold comparing steps to ascertain taking corrective action commensurate with the degree of severity of the head-disc interference. For example, the threshold comparing steps comprise an early warning program, available to the customer for detecting and predicting head/media failures using the basic method of the present invention.

Other features of the present invention are disclosed or apparent in the section entitled: "BEST MODE FOR CARRYING OUT THE INVENTION."

BRIEF DESCRIPTION OF DRAWINGS

For fuller understanding of the present invention, reference is made to the accompanying drawing in the following detailed description of the Best Mode of Carrying Out the Present Invention. In the drawings:

FIG. 6a is a display from a spectrum analyzer showing the frequency spectrum of the mechanical vibrations as detected by an acoustic emission (AE) sensor on the same experimental unit used to produce the display shown in FIG. 6.

FIG. 6b is an oscilloscope display showing oscillations, generated by mechanical vibration, as detected by an acoustic emission (AE) sensor on the same experimental unit used to produce the display shown in FIG. 6.

Reference numbers refer to the same or equivalent parts of the present invention throughout the several figures of the drawing.

BEST MODE OF CARRYING OUT THE INVENTION

Figure 1:
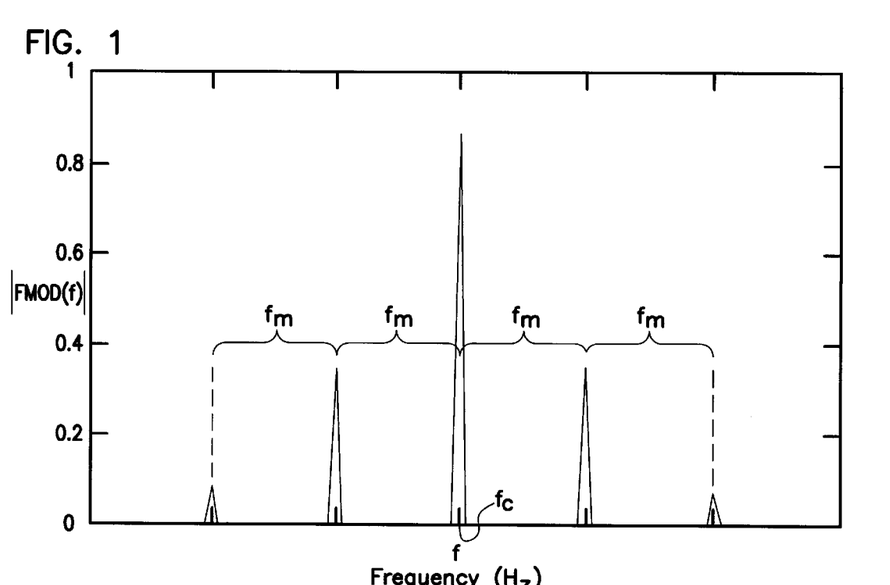
FIG. 1 is a typical frequency spectrum waveform for a frequency modulated signal.

In order to describe the best mode of carrying out the present invention, some basic principles underlying frequency modulation are first discussed. FIG. 1 shows a partial frequency spectrum of a frequency modulated signal. As illustrated, the normalized maximum magnitude of the main peak occurs at a carrier frequency $f_c$, which is known to represent the Bessel function coefficient of the zeroth order, i.e. $|J(0,\beta)|$, where $\beta$ is the modulation index defined as the ratio of the frequency deviation $\Delta f$ to the modulation frequency $f_m$, i.e., $\beta=\Delta f/f_m$. The Bessel function of the first kind of order n with argument $\beta$ is expressed as:

$$J(n, \beta) = \frac{1}{2 \cdot \pi} \int_{-\pi}^{\pi} e^{i(\beta \cdot \sin(\xi) - n\xi)} d\xi \qquad \text{Equation 1.0}$$

The side peaks are magnitude symmetrical about the carrier frequency $f_c$ and are separated by a constant frequency known as the modulating frequency $f_m$. The depicted sidebands that are symmetrical to $f_c$ are also known to represent the first and second order Bessel coefficients i.e., $|J(-1,\beta)|$, $|J(1,\beta)|$, and $|J(-2,\beta)|$, $|J(2,\beta)|$, respectively. Utilization of the foregoing basic principles underlying frequency modulations by the present invention are discussed below.

Figure 2:
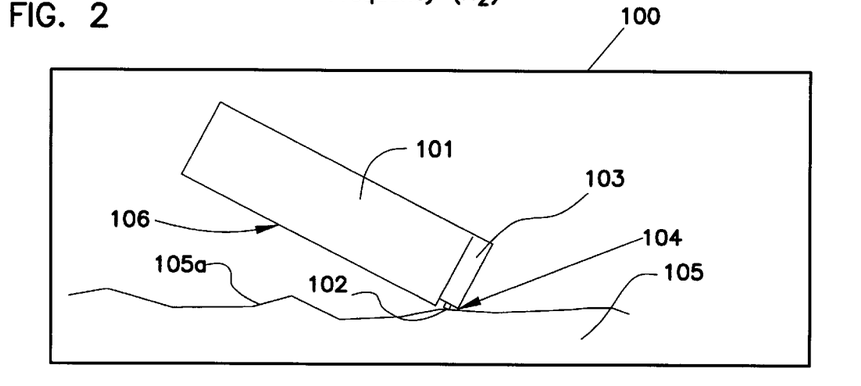
FIG. 2 is a graphical illustration of a head disk assembly depicting a slider carrying a vibration susceptible read write element that is in fly-height contact with the disc media magnetic coating.
Figure 3:
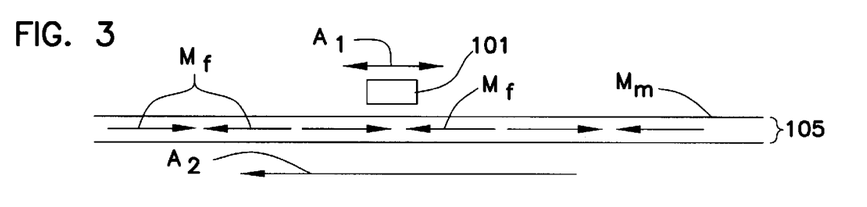
FIG. 3 is an enlarged partial cross-sectional view of an area of disc media showing a positional relationship of a read/write head and underlying recorded data in the form of magnetic flux reversals that may be read early and late due to head-disc interference in the longitudinal direction.

FIG. 2 illustrates a head disc assembly 100 including a slider member 101 comprising the read/write head gimbal assembly including a transducer 102 and alumina 103 at the distal end of slider 101. As discussed earlier, and as depicted in FIGS. 2 and 3, the fly height is a function of the head-surface separation, generally shown as numeral 104, and the depth 105 of the magnetic flux reversals Mf within the coating of the magnetic media Mm. The fly height is small, by example on the order of 0.6 micro-inch, and is impacted by the roughness of the media which is measured in terms of angstroms, by example on the order of 15 angstroms, and depends on the type of media being used. When head-disc interference occurs, the clearance between the media and the head flying over the media may approach actual contact, which is deemed a severe form of interference. The media has texture that varies in roughness and breaks air as the media travels beneath the head. The rough texture, depicted as numeral 105a, creates air turbulence that act on slider surface 106. The turbulence causes vibrations of the slider 101, typically in the 120 to 250 Khz range. These vibrations lead to slider motion in the direction A1 along the data track. This motion causes the transducer 102 to move back and forth along the track during the read back operation. This back and forth movement, or oscillation, of the head in the longitudinal axis causes the head to read magnetic flux transitions earlier and later. The earlier and later reading of the magnetic signal causes frequency modulation in the read back signal. As stated previously, the more severe the interference, the more severe the modulation.

Figure 4:
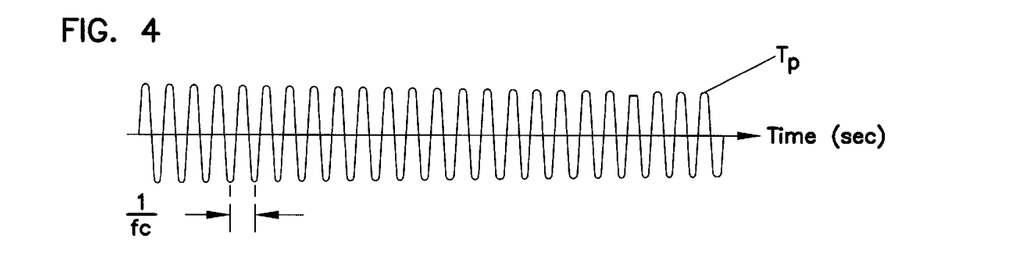
FIG. 4 is a signal waveform having a constant frequency which is exemplary of a test pattern signal which can be written onto media of a suspect disc drive unit for determining head-disc interference in accordance with the present invention.
Figure 5:
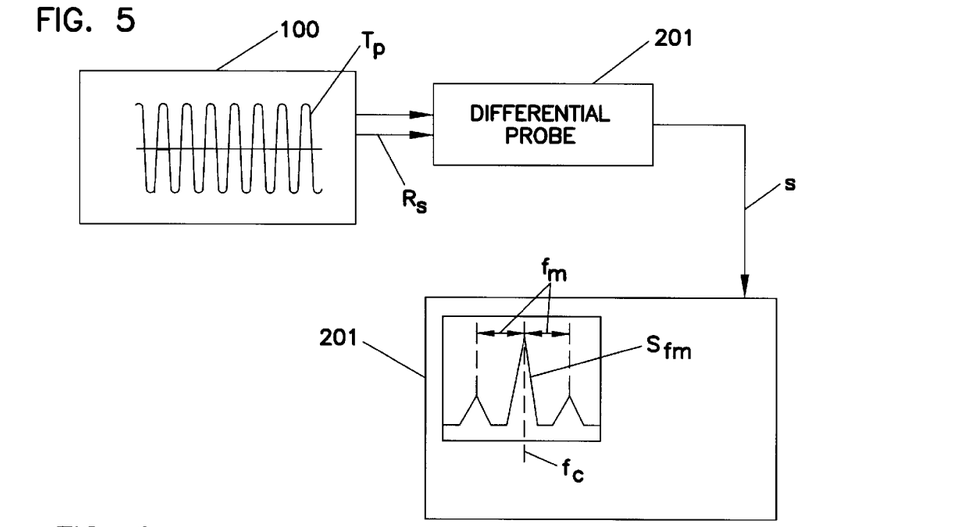
FIG. 5 is a basic set-up for detecting frequency modulations from a head-disc assembly having a pre-recorded test pattern in accordance with the present invention.
Figure 6:
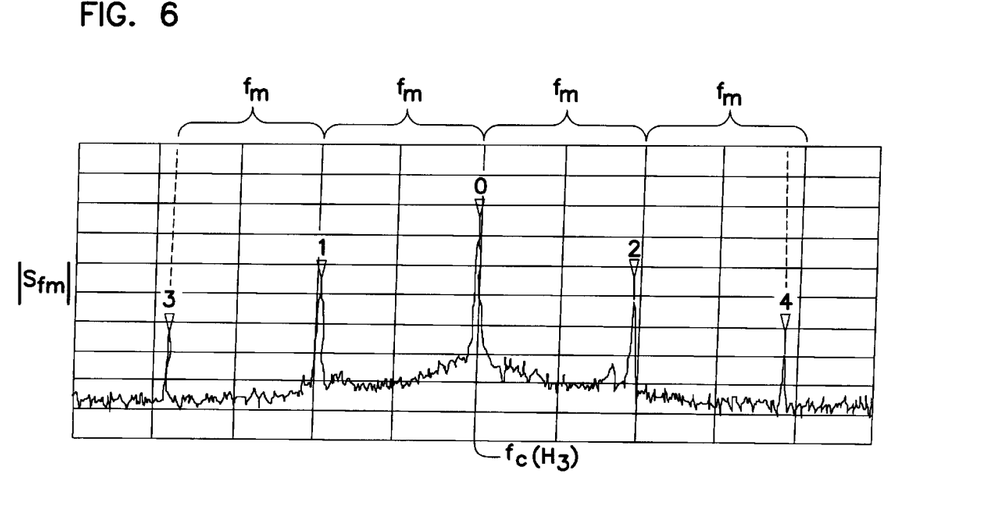
FIG. 6 is a display from a spectrum analyzer showing a frequency modulated waveform generated by head-disc interference acting on the pre-recorded test pattern.

In accordance with the objects of the present invention, and in the interest of detecting head-disc interference and determining the severity of head-disc interference in a disc drive apparatus, the present invention comprises a step of initially writing an analog test pattern Tp on a known track of a magnetic disc in a head disc assembly that may be experiencing head-disc interference, see generally FIG. 4. The test pattern comprises a pattern having a pre-selected magnitude and a preselected constant carrier frequency $f_c$ and is written onto the media by methods well known in the industry. During the writing operation, the method of the present invention may include a concurrent verification step to assure that the test pattern has not been frequency modulated. FIG. 5 shows a first method of detecting frequency modulation in a suspect head disc assembly 100. As illustrated, and in accordance with the present invention, a constant frequency test pattern Tp is written on a desired test track on a head disc assembly 100 that is setup for receiving a read signal Rs that will be sampled using, by example, a differential probe 201 that provides an output signal S that is continuously monitored for the occurrence of head-disc interferences that will generate a frequency spectrum waveform Sfm as displayed on a spectrum analyzer 200. FIG. 6 shows a frequency spectrum of an experimental read-back signal Rs that contained frequency modulation Sfm. In this particular experiment, the roughness of the media was on the order of 15 angstroms and the fly height was 0.66 micro-inches. The carrier frequency $f_c$ of the read signal observed matched the constant frequency of the test pattern Tp which was 33.14 Mhz. The FM sidebands indicated a frequency modulation $f_m$ of about 191 Khz. It should be noted that the results of the foregoing test were verified on the particular media and head assembly using prior art methods, namely the use of acoustic emission (AE) sensors to detect mechanical vibrations at about 191 Khz, see generally FIGS. 6a and 6b. While the detection of frequency modulation is facilitated by the use of spectrum analyzer 200, and may well satisfy a screening test for detecting defective disc drives, a need may exist for determining the degree of head-disc interference. This further inquiry requires further analysis of waveform Sfm, depicted in FIG. 6, which contains the detected frequency modulation and which can be used to determine the modulation index $\beta$ and peak frequency deviation $\Delta f$. From this information, and knowledge of the modulating frequency $f_m$ determined from the frequency spectrum, then the peak-peak period deviation, or timing jitters, and the longitudinal head vibration velocity and displacement are determined. As stated previously, the timing jitters represent early and late reading of the magnetic flux transitions caused by the oscillation of head 101 in the longitudinal direction, while the longitudinal head vibration velocity and displacement amplitude represent how fast and how far forward and backward the head moves. The displacement amplitude is a measure of the severity of the head-disc interference in the longitudinal direction, i.e. in the direction along the data track. However, before being able to determine these severity indicators, the modulation index β must first be determined. One way to determine the modulation index β is by an iterative computation involving Equation 1.0 for determining the low order Bessel function coefficients. The iteratively determined Bessel function coefficients are then used to determine the ratios $|J(0,\beta)|/|J(1,\beta)|$, $|J(0,\beta)|/|J(2,\beta)|$, and $|J(0,\beta)|/|J(0,\beta)|$. These ratios are then compared to the ratios of the measured values from the detected frequency spectrum, namely the ratio(s) of the main peak magnitude to the sideband magnitude(s), i.e. $|J(0,\beta)|/|J(1,\beta)|$ and/or $|J(0,\beta)|/.|J(2,\beta)|$, and/or $|J(0,\beta)|/|J(0,\beta)|$, and recomputed until an iteratively selected modulation index β yields ratios that match the ratios of the measured values taken from the detected frequency spectrum. The experimental values for |Sfm|, as depicted in FIG. 6, expressed in dB, and relating to the low order Bessel coefficients, were $J_0=0$ dB, $J_1=16.84$ dB, and $J_2=37.8$. After iteratively solving the Bessel function, expressed above in Equation 1.0, using various selected values of β, and comparing the calculated values of the ratios against the measured ratio values for $J(0,\beta)|/|J(1,\beta)|$, and $|J(0,\beta)|/|J(2,\beta)|$, a suitable value of β=0.315 was determined as being the closest. Having established the modulation index β and $f_m=191250$Hz, and knowing that $\beta=\Delta f_c/f_m$, then the peak frequency deviation $\Delta f_c=60240$ Hz was determined. The peak-peak period deviation, or timing jitters, expressed as:

$$\Delta T = \frac{1}{f_c - \Delta f_c} - \frac{1}{f_c + \Delta f_c} \qquad \text{Equation 2.0}$$

was determined to be 0.11 nano-sec. This particular timing jitter represented head-disc interference that impacted the read channel by producing longitudinal head oscillation that could cause early and late reading of recorded data by 0.11 nano-sec.

Figure 7:
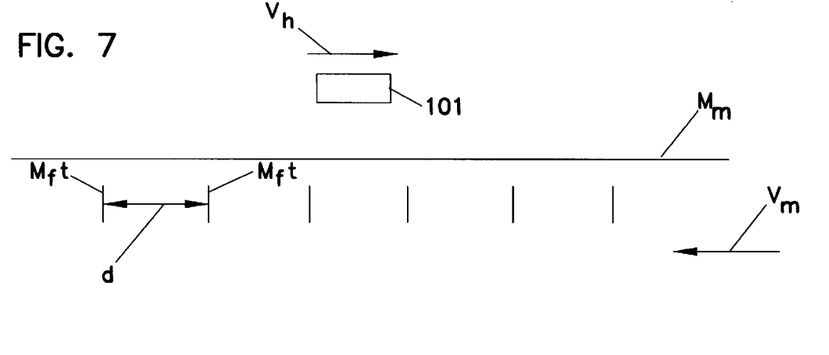
FIG. 7 is a diagram representation of a read write head positioned over traveling magnetic media which includes recorded data in the form of magnetic flux transitions $M_{ft}$.

Referring now to FIG. 7, where a diagram representation of head 101 is shown positioned over spinning magnetic media $M_M$ and reading magnetic flux transitions $M_{ft}$ of a recorded signal. Magnetic flux transitions $M_{ft}$ are recorded apart a distance d in accordance with known recording practices, by example a distance $d=4.948\times10^{-7}$ m is a typical spacing. The distance d may be expressed as $d=(V_M\times T/2)$, i.e., the linear media velocity times the period of one magnetic flux transition to the next transition. During the occurrence of longitudinal head oscillation, the relative speed of head 101 with respect to the media varies according to the head oscillations, which varies the frequency of reading the magnetic flux transitions as well. This is the longitudinal head vibration velocity $V_h$, which can be expressed as $V_h=2(d\times\Delta f_c)$, was determined to be $V_h=0.148$ ms$^{-1}$(meters/second). This speed is also the peak head flying speed deviation and is a measure of how fast the head is oscillating.

Further, assuming that the oscillations are sinusoidal, then the instantaneous head oscillation velocity can be integrated to determine the instantaneous longitudinal head displacement. This displacement can be expressed as:

$$DLH_s(t) = \int_0^t V_h(t)dt = \frac{d}{\pi} \cdot \beta \cdot \sin(\omega m(t)) \qquad \text{Equation 3.0}$$

Figure 8:
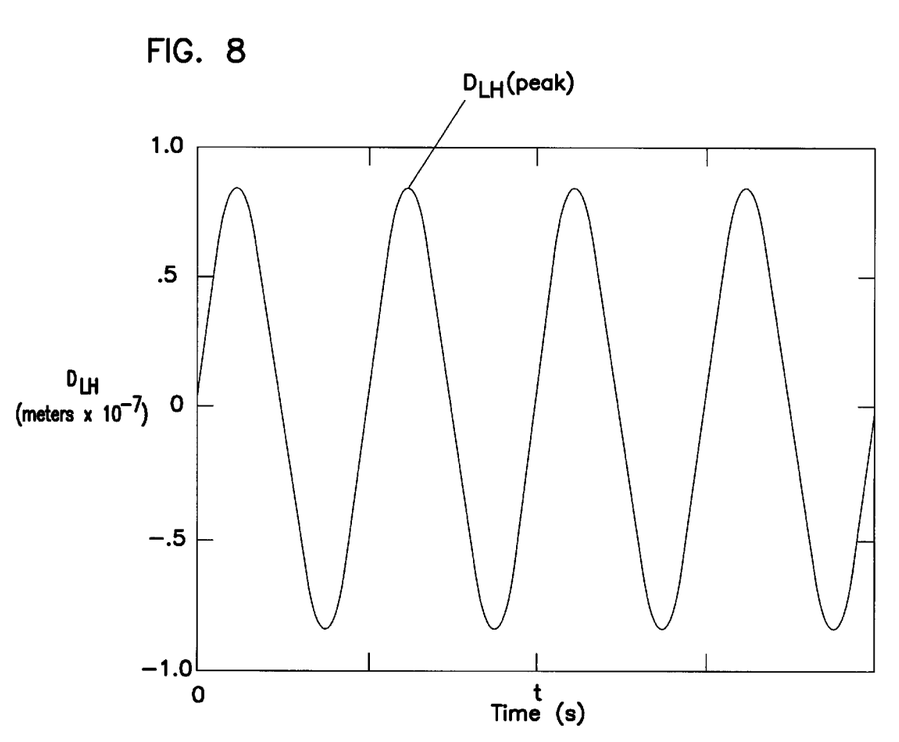
FIG. 8 is a waveform showing the calculated longitudinal head displacement with respect to time, assuming constant longitudinal head oscillation.

FIG. 8 shows a waveform of the longitudinal head displacement with respect to time. From Equation 3.0 the peak longitudinal head oscillation displacement is given by $$DLH(peak) = \frac{d}{\pi} \cdot \beta \qquad \text{Equation 4.0}$$

For the frequency modulations detected in FIG. 6, $D_{LH}$(peak)$=0.496\times10^{-7}$m. The determined longitudinal head oscillation displacement measurement can be used to establish a base value for comparing severity of head-disc interference in subsequent measurements. From Equation 4.0, it can be seen that with d and π as fixed constants, $D_{LH}$(peak) is directly proportional to the modulation index β. Therefore, the modulation index β can be used to indicate the degree of severity of the head-disc interference.

Figure 9:
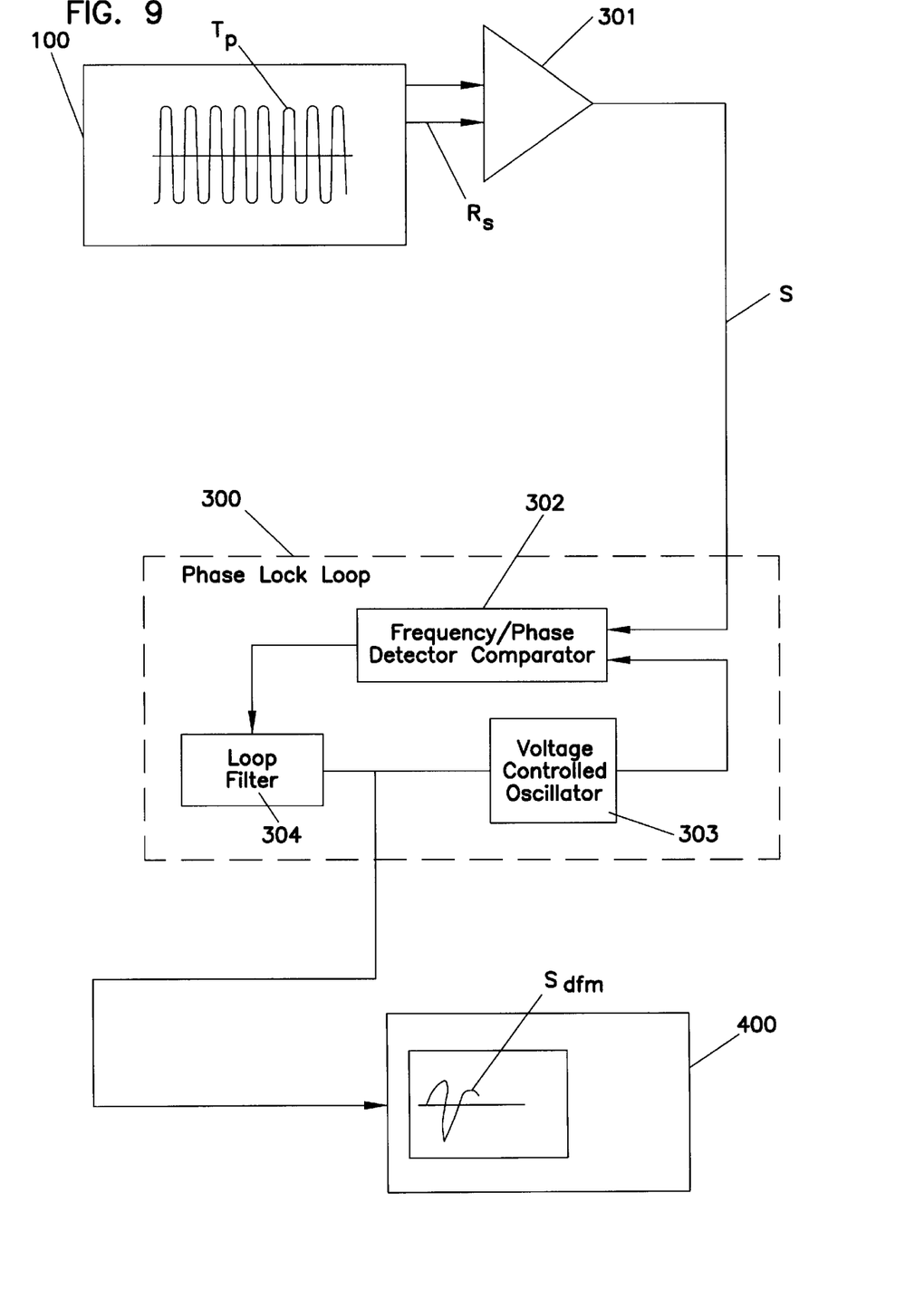
FIG. 9 is an alternative set-up in a disc drive unit utilizing a phase lock loop circuitry for detecting frequency modulations from a head-disc assembly having a pre-recorded test pattern in accordance with the present invention.

FIG. 9 shows an alternative set-up for detecting the head-disc interference in a disc drive unit by utilizing a phase lock loop as an FM demodulator circuitry 300 for detecting frequency modulation from a head-disc assembly 100 having a pre-recorded test pattern Tp written in accordance with the present invention. As illustrated, and in accordance with the present invention, constant frequency test pattern Tp is written on a desired test track on head disc assembly 100, and the written test pattern is read back as signal Rs and amplified by a differential amplifier 301 whose output signal S is received by a frequency/phase detector comparator portion 302 of phase lock loop 300. The output of the frequency phase/detector comparator is coupled into the loop filter 304, the filtered signal, $S_{dfm}$, is then used to control the voltage controlled oscillator 303. The phase lock loop 300 will track the incoming signal S, and in doing so, it will frequency demodulate the signal S. Thus, any detected head-disc interference will generate a frequency demodulated waveform $S_{dfm}$ which can be displayed on an oscilloscope 400. The severity of the head-disc interference can be determined from the waveform $S_{dfm}$ generated by the head-disc interference. The waveform $S_{dfm}$'s frequency is then the modulating frequency fm and its amplitude is the peak frequency deviation Δf, and with this information, the modulation index β, the longitudinal head vibration velocity and displacement can be determined in a similar manner as describe above. displacement can be determined in a similar manner as describe above.

Figure 10:
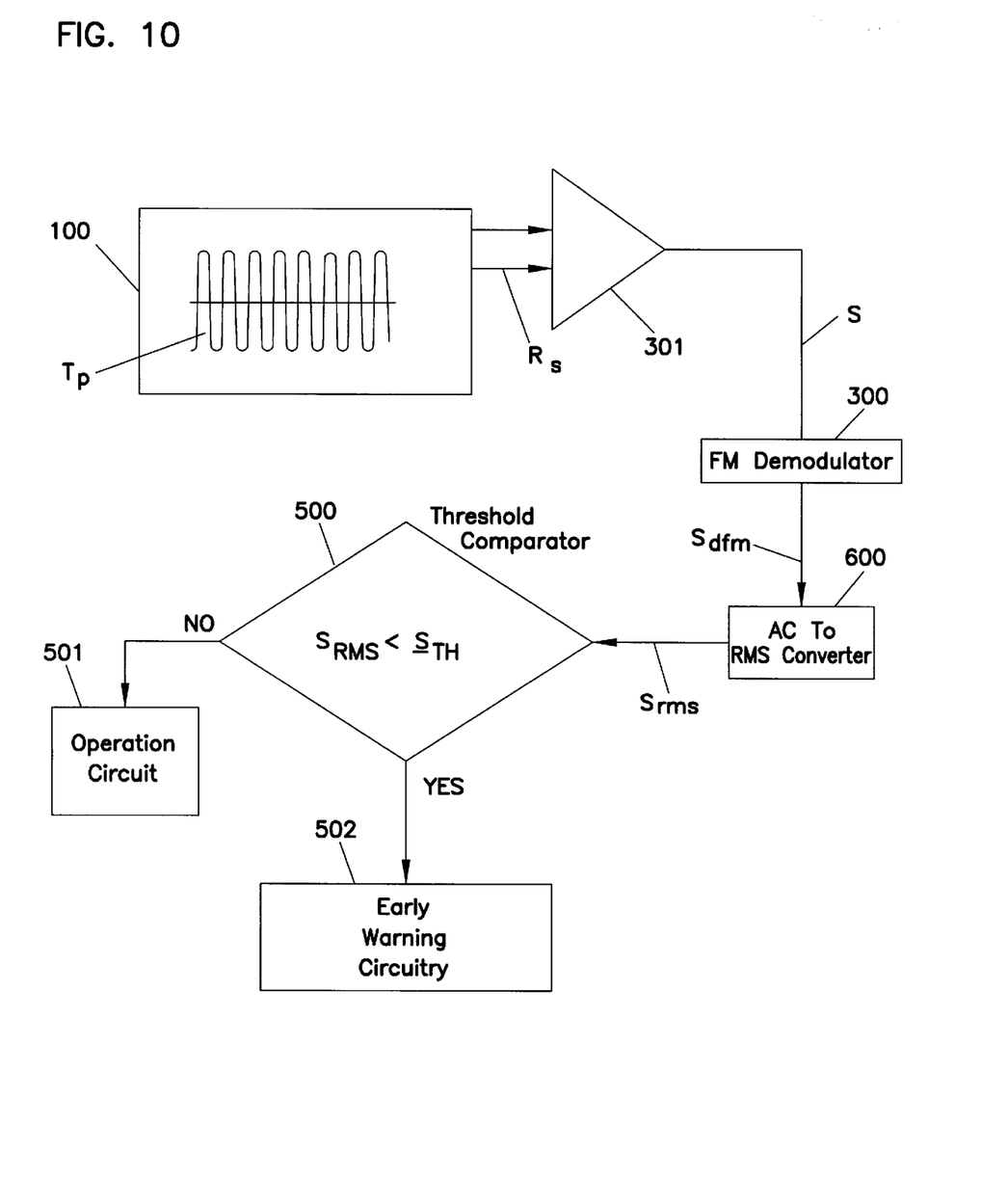
FIG. 10 is an alternative set-up in a disc drive unit utilizing not only a phase lock loop circuitry for detecting frequency modulations, but also employing a threshold comparing setup for taking corrective action commensurate with the degree of severity of the head-disc interference.

FIG. 10 is yet another alternative set-up for practicing the present invention, utilizing not only FM demodulator 300 for detecting frequency modulation generated by head-disc interference in a head disc assembly, but also employing a threshold comparing setup for taking corrective action commensurate with the degree of severity of the head-disc interference. As illustrated, and in accordance with the present invention, a constant frequency test pattern Tp is written on a desired test track on head disc assembly 100 which is setup for reading back the written signal as read signal Rs. Rs is amplified by differential amplifier 301 to generate output signal S which is then demodulated by FM demodulator 300. Any detected head-disc interference will generate a demodulated signal waveform $S_{dfm}$ which is received by an AC to RMS converter 600 whose output $S_{rms}$ (analog voltage or digital value) is compared at a logic decision circuit 500 containing in memory at least one pre-determined programmable threshold signal $S_{th}$ value (analog voltage or digital value). The arrangement in FIG. 10 is such that if the value of $S_{rms}$ exceeds $S_{th}$, in threshold comparator 500, the amount of frequency modulation is such that the head-disc interference is severe. This facilitates early warning circuitry 502 to be activated to alert the user of a head/media failure and allows preventative maintenance action to be taken before a head crash and loss of valuable data occurs. If the value of $S_{rms}$ is less than $S_{th}$, the disc drive will resume normal drive operations as instructed by operation circuit 501. The threshold values for severity of head-disc interference may be setup to alert the user at varying degrees of severity. The varying threshold values would be setup in circuit 500 and the message from circuitry 502 would be in accordance to the particular threshold value that was exceeded.

Other applications of the present invention include testing different magnetic media to determine how the surface texture and thickness impacts the head-disc interference. This application also will aid in determining how a particular fly height may need to be adjusted to minimize the head-disc interference. For example, in the particular experiment which produced frequency modulations shown in FIG. 6, the roughness of the media was about 15 angstroms and the fly height was 0.66 micro-inches. To complete an experiment directed to a particular media, the foregoing information would be recorded prior to conducting the operative steps for detecting frequency modulation and conclude with making a record containing said peak deviation and said displacement amplitude for the particular media being tested and having a known surface texture roughness and known thickness as well as a known fly height. The information relating to head-disc interference for the tested media would be important information for making decisions relating to continued use, or for setting a benchmark for future testing.

In summary, by writing a test pattern of a known carrier frequency on a disc drive and by reading back the written pattern, the existence and severity of the head-disc interference can be determined. The method involves detecting the frequency modulation in the read back signals that are generated by the head-disc interference using test equipment, such as spectrum analyzers, or modulation analyzers, or as a diagnostic tool in the field at a disk drive level using the disk drive's read/write channel electronics, namely phase lock loop as an FM demodulator. At a disc drive level of implementation, the method can include threshold comparing steps to ascertain taking corrective action commensurate with the degree of severity of the head-disc interference. For example, the threshold comparing steps comprise an early warning program, available to the customer for detecting head/media failures using the basic method of the present invention. Further, the method of the present invention can be useful for testing media and associated fly height and the impact on head-disc interference.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. The invention disclosed herein may be practised without any element which is not specifically disclosed herein.

What is claimed is:

1. A method of detecting longitudinal head oscillations caused by head-disc interference in a disk drive, said method comprising the steps of:

(a) writing a constant frequency test pattern on a selected track of a magnetic disc, said test pattern being initially void of frequency modulation;

(b) reading said test pattern and generating a read back signal; and (c) detecting spurious frequency modulation, in the range of about 120 kHz to 250 kHz, in said read back signal as an indication of a presence of longitudinal head oscillations caused by head disc-interference.

2. A method of detecting longitudinal head oscillations caused by head-disc interference in a disk drive, said method comprising the steps of:

(a) writing a constant frequency test pattern on a selected track of a magnetic disc, said test pattern being initially void of frequency modulation;

(b) reading said test pattern and generating a read back signal; and (c) detecting spurious frequency modulation in said read back signal as an indication of a presence of longitudinal head oscillations caused by head disc-interference;

(d) analyzing said detected frequency modulation for purposes of determining a degree of severity of said head-disc interference by performing tasks of measuring and recording a voltage magnitude of sidebands, a main carrier frequency and a modulating frequency ($f_m$) associated with said detected frequency modulation;

(e) determining a peak frequency deviation ($\Delta f$) of said frequency modulation; and (f) determining a modulation index ($\beta$) as a first indication of said degree of severity of said head-disc interference.

3. A method of detecting longitudinal head oscillations as described in claim 2, wherein:

said step (e) of determining a peak frequency deviation comprises determining coefficients of a Bessel function; and said step (f) of determining said modulation index comprises computing a ratio of said determined peak frequency deviation and said measured modulation frequency, namely computing $\beta = \Delta f / f_m$.

4. A method of detecting longitudinal head oscillations as described in claim 2, said method further comprising the steps of:

(g) determining a peak period deviation, a longitudinal head vibration velocity and a displacement amplitude of said longitudinal head oscillation, said displacement amplitude being directly proportional to said modulation index $\beta$ determined in said step (f) and being a second indication of said degree of severity of said head-disc interference.

5. A method of detecting longitudinal head oscillations as described in claim 1, wherein:

said step (b) comprises reading said test pattern by using a differential probe; and said step (c) comprises detecting said frequency modulation using a spectrum analyzer.

6. A method of detecting longitudinal head oscillations as described in claim 1, wherein:

said steps (b) and (c) comprises reading and detecting said test pattern by using a modulation analyzer capable of detecting a frequency modulation, a modulation index, a peak frequency deviation and modulation frequency, and said method further comprises:

detecting said frequency modulation, said modulation index, said peak frequency deviation and said modulation frequency on said modulation analyzer, said modulation index being a first indication of the degree of severity of said head-disc interference; and determining a second indication of said degree of severity of said head-disc interference by determining a longitudinal head vibration velocity and peak longitudinal head oscillation displacement.

7. A method of detecting longitudinal head oscillations as described in claim 1, wherein:

said steps (b) and (c) comprises reading said test pattern and detecting frequency modulation by utilizing a disk drive's read/write channel electronics, comprising a phase lock loop circuit used as an FM demodulator.

8. A method of detecting longitudinal head oscillations as described in claim 7, wherein said method further comprises the step of:

employing a threshold comparing setup for taking operative corrective action in using said disc drive, said setup comprising a plurality of threshold signal magnitude values for being compared against a signal magnitude associated with said detected frequency modulation, said plurality of threshold signal magnitude values being related to degrees of head-disc interference severity.

9. A method of detecting and measuring severity of longitudinal head oscillation caused by head-disc interference in a disc drive, said method comprising the steps of:

(a) writing a constant frequency test pattern on a selected track of a magnetic disc;

(b) reading said test pattern and generating a read back signal;

(c) detecting frequency modulation in said read back signal;

(d) analyzing said detected frequency modulation for purposes of determining the degree of severity of said head-disc interference by performing tasks of measuring and recording a voltage magnitude of sidebands, a main carrier frequency and a modulating frequency ($f_m$) associated with said detected frequency modulation;

(e) determining a peak frequency deviation ($\Delta f$) of said frequency modulation; and (f) determining a modulation index ($\beta$) as a first indication of said degree of severity of said head-disc interference; and (g) determining a peak period deviation, a longitudinal head vibration velocity and a displacement amplitude of said longitudinal head oscillation, said displacement amplitude being directly proportional to said modulation index $\beta$ determined in said step (f) and being a second indication of said degree of severity of said head-disc interference.

10. A method of detecting and measuring severity of longitudinal head oscillations as described in claim 9, wherein:

said step (e) of determining a peak frequency deviation comprises determining coefficients of a Bessel function; and said step (f) of determining said modulation index comprises computing a ratio of said determined peak frequency deviation and said measured modulation frequency, namely computing $\beta = \Delta f / f_m$.

11. A method of detecting and measuring severity of longitudinal head oscillations as described in claim 9, wherein:

said step (b) comprises reading said test pattern by using a differential probe; and said step (c) comprises detecting said frequency modulation using a spectrum analyzer.

12. A method of detecting and measuring severity of longitudinal head oscillations causing head-disc interference in a disc drive, said method comprising the steps of:

(a) writing a constant frequency test pattern on a selected track of a magnetic disc;

(b) reading said test pattern and generating a read back signal;

(c) detecting frequency modulation in said read back signal by using a modulation analyzer and generating a modulation index, a peak frequency deviation and modulation frequency, said modulation index being a first indication of the degree of severity of said head-disc interference; and (d) determining a second indication of said degree of severity of said head-disc interference by determining a longitudinal head vibration velocity and peak longitudinal head oscillation displacement of said longitudinal head oscillation.

13. A method of detecting longitudinal head oscillations causing head-disc interference in a disc drive, said method comprising the steps of:

(a) writing a constant frequency test pattern on a selected track of a magnetic disc;

(b) reading said test pattern and generating a read back signal;

(c) detecting frequency modulation, in the range of about 120 kHz to 250 kHz, in said read back signal by utilizing a disk drive's read/write channel electronics, comprising a phase lock loop circuit used as an FM demodulator.

14. A method of detecting longitudinal head oscillations as described in claim 13, wherein said method further comprises the step of:

employing a threshold comparing setup for taking operative corrective action in using said disc drive, said setup comprising a plurality of threshold signal magnitude values for being compared against a signal magnitude associated with said detected frequency modulation, said plurality of threshold signal magnitude values being related to degrees of head-disc interference severity.

15. A method of preventing head crashes in a disc drive due to longitudinal head oscillations causing head-disc interference, said method comprising the steps of:

(a) writing a constant frequency test pattern on a selected track of a magnetic disc;

(b) reading said test pattern and generating a read back signal;

(c) detecting frequency modulation, in the range of about 120 kHz to 250 kHz, in said read back signal by utilizing a disk drive's read/write channel electronics, comprising a phase lock loop circuit used as an FM demodulator; and (d) employing a threshold comparing setup for taking operative corrective action in using said disc drive, said setup comprising a plurality of threshold signal magnitude values for being compared against a signal magnitude associated with said detected frequency modulation, said plurality of threshold signal magnitude values being related to degrees of head-disc interference severity.

16. A method for evaluating impact of a magnetic media disc's surface texture and operational head fly height in a disc drive on head-disc interference, said method comprising the steps of:

(a) providing a magnetic media disc having a known surface texture roughness;

(b) providing a known thickness of said magnetic media disc;

(c) providing a known fly height between said magnetic media disc and a head element;

(d) writing a constant frequency test pattern on a selected track of said magnetic media disc;

(e) reading said test pattern and generating a read back signal;

(f) detecting frequency modulation in said read back signal;

(g) analyzing said detected frequency modulation for purposes of determining the degree of severity of said head-disc interference by performing tasks of measuring and recording a voltage magnitude of sidebands, a main carrier frequency and a modulating frequency ($f_m$) associated with said detected frequency modulation;

(h) determining a peak frequency deviation ($\Delta f$) of said frequency modulation; and (i) determining a modulation index ($\beta$) as a first indication of said degree of severity of said head-disc interference;

(j) determining a peak period deviation, a longitudinal head vibration velocity and a displacement amplitude of said longitudinal head oscillation, said displacement amplitude being directly proportional to said modulation index $\beta$ determined in said step (i) and being a second indication of said degree of severity of said head-disc interference; and (k) making a record containing said peak period deviation and said displacement amplitude in said step (j), said known surface texture roughness, said known thickness of said magnetic media disc, and said known fly height, as provided in said steps (a), (b), and (c), as information relating to said head-disc interference by said provided magnetic media disc operating at said fly height.

17. A disc drive apparatus, said apparatus comprising:

a head disc assembly, said disc assembly having a constant frequency test pattern written on a selected track of a magnetic disc;

a read/write channel electronic circuit comprising a phase lock loop circuit used as an FM demodulator, said phase lock loop circuit being electronically coupled to said head disc assembly for reading said test pattern, said phase lock loop circuit detecting frequency modulation, in the range of about 120 kHz to 250 kHz, during reading of said test pattern; and said phase lock loop circuit having output means for use in displaying said detected frequency modulations.

18. A disc drive apparatus, as described in claim 17, said apparatus further comprising:

a threshold comparing circuit setup for producing operative corrective action in using said disc drive, said setup comprising electronic means for storing a plurality of threshold signal magnitude values for being compared against a signal magnitude associated with said detected frequency modulation, said plurality of threshold signal magnitude values being related to degrees of head-disc interference severity, said electronic means comprising logic decision generating circuitry having a memory for storing at least one threshold amplitude value of a base frequency modulation, an early warning circuit portion for alerting a user of a severity of head-disc interference and further having a resume operation circuit portion for resuming normal operations of said disc drive if a an amplitude of a detected frequency modulation is less than a stored threshold amplitude value.

* * * * *